May 1, 1962 — R. H. THURSTON — 3,032,367
GRAPPLE DEVICE
Filed March 6, 1958
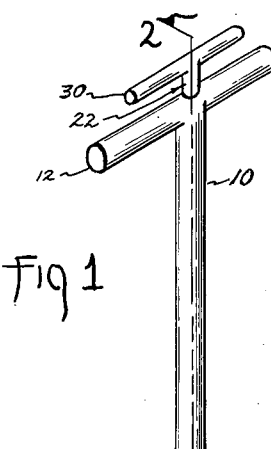
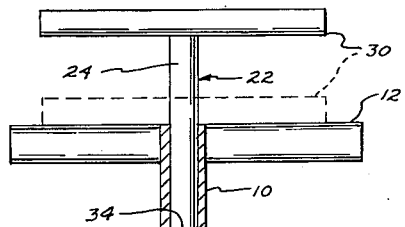
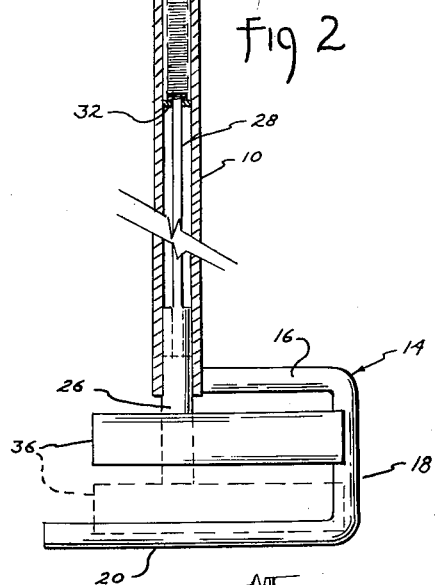
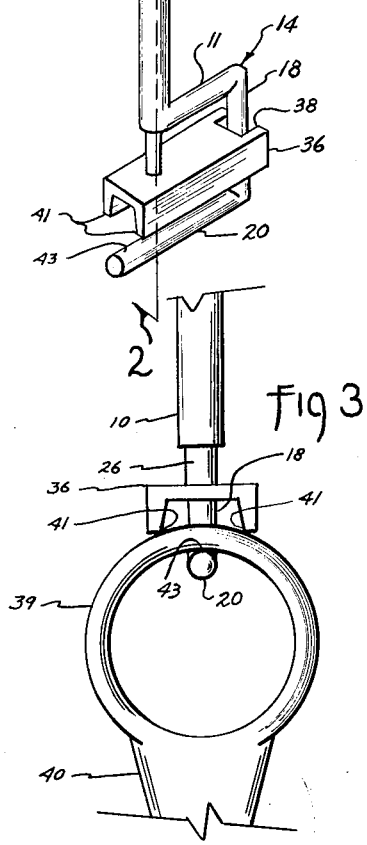
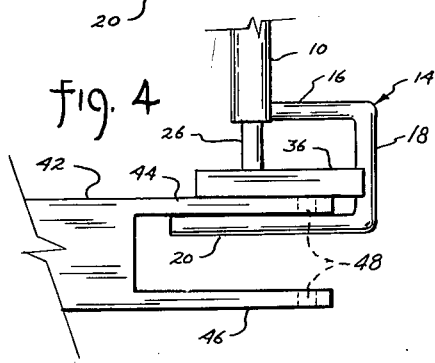
INVENTOR
RALPH H. THURSTON
BY Donald H. Zarley
ATTORNEY United States Patent Office 3,032,367
Patented May 1, 1962

3,032,367
GRAPPLE DEVICE
Ralph H. Thurston, Hamilton County, Iowa
(Rte. 2, Radcliffe, Iowa)
Filed Mar. 6, 1958, Ser. No. 719,673
1 Claim. (Cl. 294—103)

My invention relates to grapples and more particularly to a grapple device that will facilitate the manual lifting of objects.

One of the greatest inconveniences in the farming operation is for the tractor operator to continuously get off the tractor for purposes of attaching and detaching the tongue units of various machines to and from the drawbar of the tractor. The attaching of a machine to a tractor generally involves the aligning of holes in a clevis-like element on the tongue of the implement with a hole in the tractor drawbar, and the placing of a drawbar pin through the registering holes. The drawbar pins are of different construction but generally have a ring at their top ends to facilitate handling thereof. The tongues on most farm implements are substantially heavy and much pressure must be exerted to remove a drawbar pin that is wedged in slightly disaligned holes of the tractor drawbar and implement tongue. My invention relates directly to a grapple device that will eliminate the need for the operator to climb on and off the tractor to accomplish the tractor-implement engaging and disengaging operation.

There have been many grapple devices constructed to facilitate various operations. These operations range from picking up trash to retrieving fish from water. However, the grasp that these grapple devices have on a given object is no stronger than the grip of the operator's hand. Some of these grapple devices known to me require the use of both hands to hold an object. These devices also do not present surfaces that can easily lock and hold an object in their grasp.

Therefore, the principal object of my invention is to provide a grapple device that will permit a tractor operator to engage and disengage an implement to and from the tractor without having to depart therefrom.

A further object of my invention is to provide a grapple device that does not entirely rely on the strength of the operator's hand for the strength of its grasp on an object.

A still further object of my invention is to provide a grapple device that will facilitate the manual lifting of heavy objects.

A still further object of my invention is to provide a grapple device that can be operated with one hand.

A still further object of my invention is to provide a grapple device that will present a three-point contact surface to the grasped object for more secure gripping characteristics.

A still further object of my invention is to provide a grapple device that is economical of manufacture, durable in use and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawing, in which:

FIG. 1 is a perspective view of my device in its normal, inoperative position;

FIG. 2 is a partial sectional view of my device taken on line 2—2 of FIG. 1;

FIG. 3 is a partial front elevational view of my device grasping the ring of a drawbar pin; and FIG. 4 is a partial side elevational view of my device grasping the tongue of a farm implement.

I have used the numeral 10 to generally designate a hollow elongated open-end tube with a handle crossbar 12 rigidly secured to the sides thereof at the top end. Handle crossbar 12 extends laterally from the top of tube 10. A U-shaped bracket 14 is rigidly secured to the bottom of tube 10 by horizontal leg 16. Vertical leg 18 and bottom horizontal leg 20 complete the structure of bracket 14. As clearly shown in FIG. 2, leg 20 of bracket 14 should be longer than leg 16 and leg 20 preferably should extend across the bottom of tube 10 in spaced apart relation.

A plunger shaft 22 is slidably mounted within tube 10 and is comprised of enlarged shaft segments 24 and 26 which are rigidly connected by rod 28. Shaft segments 24 and 26 have substantially the same diameter as the inside diameter of tube 10. Rod 28 is substantially smaller in cross section than shaft segments 24 and 26. As shown in FIGS. 1 and 2, shaft segment 24 extends out of the top of tube 10 and shaft segment 26 extends out of the bottom thereof. A handle crossbar 30 is rigidly secured to the upper end of shaft segment 24 and is parallel to crossbar 12 on the top of tube 10.

A horizontal washer member 32 is rigidly secured to the inside periphery of tube 10 in any convenient manner. Washer 32 embraces rod 28 and is located within tube 10 at a point in between the normal operating position of shaft segments 24 and 26. A spring 34 embraces rod 28 and extends upwardly from washer 32 to the lower end of shaft segment 24. The spring 32 is normally in its expanded condition and yieldingly holds plunger shaft 22 in a position with respect to tube 10, as shown by the solid lines in FIG. 2.

A horizontal channel member 36 is rigidly secured to the lower end of shaft segment 26 and is adapted to move down and embrace leg 20 of bracket 14 when plunger shaft 22 is in its lowermost position. As shown in FIG. 1, one end of channel member 36 has a notch opening 38 to permit the channel member to slidably embrace leg 18 of bracket 14.

FIG. 3 shows my device engaging a ring 39 of drawbar pin 40. The numerals 41 designate the lowermost points of the flanges of channel member 36 and the numeral 43 designates the uppermost point of leg 20 on bracket 14. The tongue 42 of a farm implement (not shown) is shown in FIG. 4. Clevis elements 44 and 46 rigidly extend from tongue 42 and aligned holes 48 extend through these clevis elements. Holes 48 are adapted to receive drawbar pin 40. The tractor drawbar has not been shown.

The normal operation of my device is as follows: Whenever the operator wishes to withdraw a drawbar pin 40 from the clevis elements and/or tractor drawbar, the leg 20 is inserted within the ring 39 of the pin. The crossbar handle 30 on plunger shaft 22 is then manually forced downwardly within tube 10 to the position shown by the dotted lines in FIG. 2. This downward action of plunger shaft 22 compresses spring 34. As shown in FIG. 3, the ring 39 of drawbar pin 40 is held by the leg 20 of bracket 14 and the flanges of channel member 36. Even though the drawbar pin 40 may be wedged within its means of support, the manual lifting force of the operator can be conveyed through leg 20 of bracket 14 to exert a great lifting force on the pin. However, this lifting force is not dependent upon the strength of the operator's hand-gripping action which holds channel member 36 in contact with the pin. In other words, the operator does not have to rely on the gripping portions 30 and 12 being closed upon each other in order to lift an object, as the weight of the object is directly supported by bracket 14 alone. Channel 36 merely is closed on bracket 14 to keep the object on the bracket. However, the three-point gripping action exerted on the pin ring 39 at points 41 and point 43 prevents any lateral slipping action of the pin with respect to my device during the lifting operation. The same three contact points are also present when the implement tongue 42 is lifted on or off the tractor drawbar and, again, the operator's grip on the device does not limit the lifting force which can be exerted on the implement tongue.

When the operator loosens his grip on the crossbar handles 12 and 30, the plunger shaft 22 is urged upwardly into tube 10 so that channel member 36 can release its grasp on the pin ring 39 or clevis element 44.

It is therefore seen that my device can easily be operated with one hand. By placing spring 34 within tube 10, the spring is protected from damage and the life of my device is prolonged. Thus, my invention will accomplish at least all of its stated objectives.

Some changes may be made in the construction and arrangement of my grapple device without departing from the real spirit and purpose of my invention, and it is my intention to cover by my claim, any modified forms of structure or use of mechanical equivalents which may be reasonably included within their scope.

I claim:

In a grapple device capable of being operated by one hand, a first elongated member, a gripping means on one end of said member extending in a lateral direction therefrom, an inverted horizontal U-shaped channel on the other end of said first elongated member, a second elongated member movably secured to said first elongated member, a gripping means on one end of said second elongated member adjacent and substantially parallel to said gripping means on said first elongated member, a bracket comprised of a rod having a circular cross section on the other end of said second elongated member, said rod extending laterally outwardly from said second elongated member, thence downwardly to form a vertical leg, and thence horizontally to form a horizontal leg below and in alignment with said inverted U-shaped channel, a notch in one end of said inverted U-shaped channel, said rod being of such dimensions that said vertical leg of said rod dwells within said notch, said second elongated member having a sufficient length to permit said horizontal leg of said rod to dwell within said inverted U-shaped channel at times, and a spring means connecting said first and second elongated members to yieldingly hold said inverted U-shaped channel and the horizontal leg of said rod in spaced relation.

References Cited in the file of this patent

UNITED STATES PATENTS

| | | |
|---|---|---|
| 256,611 | Askew | Apr. 18, 1882 |
| 400,273 | Valiquet | Mar. 26, 1889 |
| 844,528 | Mendelson | Feb. 19, 1907 |
| 1,158,637 | Chorvath et al. | Nov. 2, 1915 |
| 1,321,246 | Roth | Nov. 11, 1919 |
| 2,243,305 | Adler | May 27, 1941 |
| 2,454,878 | Marler | Nov. 30, 1948 |
| 2,816,792 | Dixon | Dec. 17, 1957 |